Oct. 6, 1964  W. J. FOXWELL ETAL  3,151,882
TRACTOR DRAFT LINKAGE
Filed March 23, 1961  2 Sheets-Sheet 1
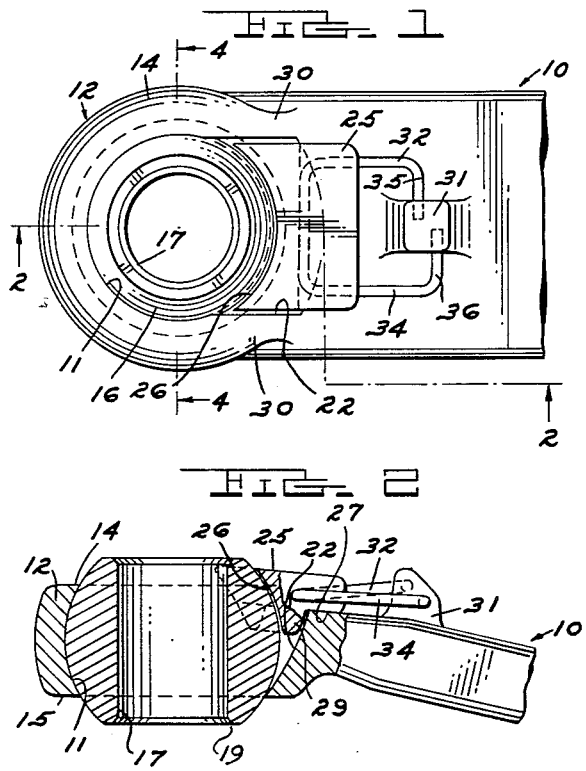
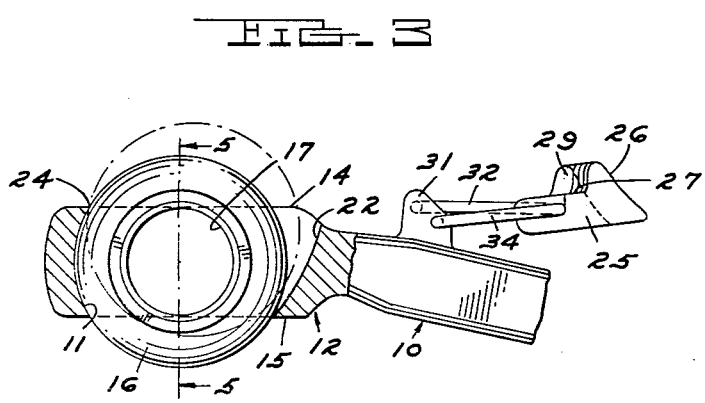
WILLIAM J. FOXWELL
WILLIAM R. PRICE
INVENTORS
BY
P. F. Hilder
ATTORNEY

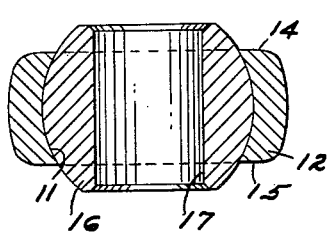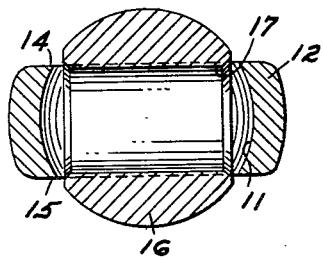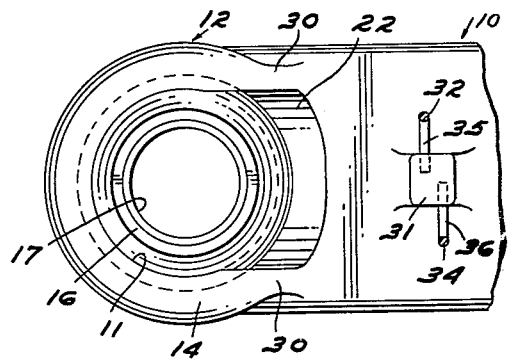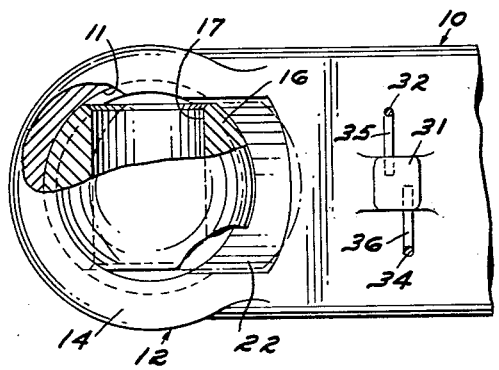

United States Patent Office 3,151,882
Patented Oct. 6, 1964

3,151,882
TRACTOR DRAFT LINKAGE
William J. Foxwell, Romford, Essex, and William R. Price, Hornchurch, Essex, England, assignors to Ford Motor Company, Dearborn, Mich.
Filed Mar. 23, 1961, Ser. No. 97,828
5 Claims. (Cl. 280—415)

This invention relates to tractor draft links of the so-called "three point hitch" type, and more particularly to a construction facilitating use of such links with implements having different pin sizes for connection with the links.

Tractors utilizing the three point hitch for implements have a pair of lower draft links and a top link, all of the links having ball joints at each end capable of limited universal movement. The balls of the joints are received within spherical sockets in the ends of the links and each ball (actually a segment of a sphere) is provided with an axially extending hole for receiving a pin carried by the tractor or the implement. Two different categories of hitches have been established by industry standard for different sizes of tractors and implements, the different categories requiring different diameters of holes in the balls at the rear ends of the tractor links for receiving the implements.

The present invention is directed to an improved lower link construction whereby the links may easily be changed over from one category to the other. In the links of the present invention, the spherical bearing socket at the rear end of each lower link is machined to form a single groove or channel at one side of the socket, the channel being only slightly wider than the width of the ball and deep enough to permit the ball, after it has been rotated within the socket until the axis of the hole is generally vertical, to be rolled from the socket and replaced with a similar ball having a hole of different diameter.

Among the objects of the present invention is to provide an improved tractor lower link that may rapidly and easily be connected to the other category of hitch; to provide such a lower link in which the ball at the rear of the link may easily be removed and replaced; to provide such a link construction which is simple and easily manufactured and which is durable and dependable in operation; and generally to improve tractor link constructions of the type described.

Other objects and objects relating to details of manufacture and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 1 is a side elevation of the rear portion of a tractor lower draft link constructed according to the present invention.

FIGURE 2 is a horizontal section of the rear portion of the draft link, taken generally along the line 2—2 of FIGURE 1.

FIGURE 3 is a view similar to FIGURE 2, the ball retainer being folded back and the ball being shown rotated within the socket for removal. A second position of the ball during the course of removal is indicated in broken line.

FIGURE 4 is a transverse vertical section of the rear end of the draft link taken generally along the line 4—4 of FIGURE 1.

FIGURE 5 is a transverse section of the rear end of the draft link taken generally along the line 5—5 of FIGURE 3.

FIGURE 6 is an elevation similar to FIGURE 1, the ball retainer being broken away.

FIGURE 7 is a view similar to FIGURE 6, the ball having been rotated through 90° for removal from the socket.

The device of the present invention is an improvement of tractor lower draft links for a tractor of the so-called three-point hitch type, in which implements are carried from three links extending rearwardly from the tractor rear axle housing. A tractor of this general type is shown in H. L. Brock, U.S. Patent No. 2,624,257. In tractors of this type, the lower links of the tractor normally are in tension due to draft on an implement, e.g. plow, when in use. The top link normally is in compression, and a hydraulic lift system can be utilized to control implement height so as to maintain a more or less uniform draft on the tractor, if desired. The lower draft link and the top link of the tractor have a pivotal connection with both the tractor and the implement which permits limited universal movement so that the implement can move laterally at all times as well as be swung vertically as the links are raised and lowered.

Implements of the "three-point hitch" system usually are provided with an A-frame which includes a pair of lateral, outwardly extending, aligned pins for receiving the rear ends of the lower draft links and a central, top pin for receiving the rear end of the top link. Industrywide standards have been established for three-point hitches, Category 1 links having been established for smaller tractors and implements and Category 2 links having been established for larger tractors and implements. The lower pins for Category 2 implements are of larger diameter than for Category 1 implements, thus requiring a larger hole in the ball joint at the rear end of each lower link. The present invention is directed to a lower link construction in which the balls at the rear ends of the lower links may readily be removed and replaced by balls having a different size hole to accept the other category of implement.

Referring now to the drawings, each tractor lower draft link 10 is provided with a spherical socket 11 formed with a somewhat thickened end portion 12 at the rear end of the link. The spherical socket 11 intersects both sides 14 and 15 of the draft link, the spherical socket comprising a surface which is a segment of a sphere extending equal distances from the center thereof which coincides with the midplane of the end portion 12 of the lower link.

A ball 16 is received within the spherical socket 11, the ball having an outer surface comprising a segment of a sphere fitting closely within the spherical socket. A hole or bore 17 extends through the center of the sphere defined by the outer contour of the ball, the hole 17 being of such diameter that the width of the segment between the parallel sides 19, 19 of the ball is somewhat greater than the width of end portion 12 of the draft link (see FIGURE 2). If desired, the outer ends of the hole 17 may be slightly chamfered and there may be a narrow circular flat surface provided between the hole 17 and the spherical outer surface of the ball.

To permit removal of the ball 16 from the socket 11 and substitution of a ball of the same spherical diameter but having a smaller size hole 17 to receive Category 1 implements and preferably lesser width between the parallel faces of the ball, a channel 22 is machined in the spherical socket 11 to permit the ball to be rolled from the socket. The channel 22, which is slightly greater in width than the distance between the parallel sides 19, 19 of the ball, increases in depth from zero depth at one side of the socket to the other (see FIGURES 2 and 3). Thus, by rotating the ball 90°, so that the axis of the hole 17 is generally vertical or parallel with the plane of the rear end portion 12 of the link, the ball can be rolled outwardly from the socket, as indicated in broken line in FIGURE 3. The channel must be sufficiently deep to permit the opposite side of the ball to roll past the edge 24 of the socket diametrically opposite the channel (see FIGURE 3).

Except when the implement supported from the links is in transport or working under extremely light draft, the lower draft links of the tractor are in tension and the ball 16 is urged against the rear half of the spherical socket 11. In order not to cut away this bearing surface in forming the channel 22 to permit removal of the ball, the channel is formed preferably entirely, and at least principally, in the forward half of the spherical socket 11. Thus, the channel 22 will not substantially affect the bearing area between the ball and the socket when the link is under heavy load.

When an implement is coupled with the draft link 10, the laterally extending pins of the implement will maintain the axis of the hole 17 in the ball of each link generally horizontal so that there will be no tendency of the ball to rotate and be lost from the socket 11 through the channel 22. However, in order to prevent fortuitous loss of the ball 16 from the socket 11 by rotation of the ball when no implement is attached, a ball retainer 25 may be provided to functionally close the channel 22 and prevent loss of the ball.

The retainer 25 comprises a block shaped as indicated in the drawings, one edge surface 26 of the retainer being curved to coincide generally with the outer surface 21 of the ball and an inner surface 27 of the retainer being adapted to be swung into position across the outer end of the channel 22. If desired, a portion 29 of the retainer may actually enter within the channel 22 to aid in maintaining the retainer in position. When in retainig position, the retainer 25 preferably fits between a pair of raised bead portions 30, 30 formed on the side of the end portion of the link to protect the retainer against displacement.

The retainer 25 is mounted for swinging movement on a projection 31 formed on the link 10 adjacent the socket 11. This mounting preferably includes a pair of spaced, springy wires 32 and 34 extending from the retainer 25 in parallel relation and having their ends 35 and 36, respectively, turned inwardly in offset, parallel relation and journalled within projection 31 of the link. The arrangement is such that the retainer 25 will be biased into either the position shown in FIGURE 2 closing the end of the channel 22, or displaced 180° as in FIGURE 3 to permit removal of the ball 16 and substitution of a ball of the other category.

We claim:

1. A tractor lower draft link, comprising a rearwardly extending link having means at its forward end for pivotal attachment to a tractor and having a spherical socket at its rear end formed as a segment of a sphere intersecting both sides of the link, and a ball closely received within the spherical socket, the ball having a hole extending diametrically thereof, the forward wall of the socket having a channel formed therein extending in from one side of the link for the entire width of the socket and the rearward wall of the socket having an uninterrupted spherical contour, the channel having a width slightly greater than the width of the ball measured along the hole and a depth sufficient to permit the ball to be rolled into the socket with the axis of the hole generally vertical.

2. A tractor lower draft link, comprising a rearwardly extending link having means at its forward end for pivotal attachment to a tractor and having a spherical socket at its rear end formed as a segment of a sphere intersecting both sides of the link, and a ball closely received within the spherical socket, the ball having a hole extending diametrically thereof, the forward wall of the socket having a channel formed therein extending in from one side of the link for the entire width of the socket and the rearward wall of the socket having an uninterrupted spherical contour, the channel having a width slightly greater than the width of the ball measured along the hole and a depth sufficient to permit the ball to be rolled into the socket with the axis of the hole generally vertical, and a retainer swingably mounted on the link adjacent the socket and adapted to be swung into position closing said channel to prevent fortuitous loss of the ball from the socket.

3. A tractor lower draft link, comprising a rearwardly extending link having means at its forward end for pivotal attachment to a tractor and having a spherical socket at its rear end formed as a segment of a sphere intersecting both sides of the link, and a ball closely received within the spherical socket, the ball having a hole extending diametrically thereof, the forward wall of the socket having a channel formed therein extending in from one side of the link for the entire width of the socket and the rearward wall of the socket having an uninterrupted spherical contour, the channel having a width slightly greater than the width of the ball measured along the hole and a depth sufficient to permit the ball to be rolled into the socket with the axis of the hole generally vertical, and a retainer adapted to be positioned at least partly within said channel to close said channel and prevent fortuitous loss of the ball from the socket.

4. A tractor lower draft link, comprising a rearwardly extending link having means at its forward end for pivotal attachment to a tractor and having a spherical socket at its rear end formed as a segment of a sphere intersecting both sides of the link, and a ball closely received within the spherical socket, the ball having a hole extending diametrically thereof, the forward wall of the socket having a channel formed therein extending in from one side of the link for the entire width of the socket, the channel having a width slightly greater than the width of the ball measured along the hole and a depth sufficient to permit the ball to be rolled into the socket with the axis of the hole generally vertical, and a retainer swingably mounted on the side of the link adjacent the socket and adapted to be swung into position at least partly within said channel to close said channel and prevent fortuitous loss of the ball from the socket, the retainer being spring-biased into channel-closing position.

5. A tractor lower draft link as specified in claim 3 in which the portion of the retainer adapted to lie within the channel has a surface lying generally in extension of the spherical surface of the socket.

References Cited in the file of this patent

UNITED STATES PATENTS

| | | |
|---|---|---|
| 1,904,387 | Rhodes | Apr. 18, 1933 |
| 2,309,281 | Steele | Jan. 26, 1943 |
| 2,673,507 | Sawyer | Mar. 30, 1954 |
| 2,698,564 | Sawyer | Jan. 4, 1955 |

FOREIGN PATENTS

| | | |
|---|---|---|
| 655,735 | Great Britain | Aug. 1, 1951 |